(12) United States Patent
Puig et al.

(10) Patent No.: US 7,631,306 B1
(45) Date of Patent: Dec. 8, 2009

(54) SYSTEM AND METHOD FOR NETWORK IMAGE PROPAGATION WITHOUT A PREDEFINED NETWORK

(75) Inventors: Ricardo S. Puig, Round Rock, TX (US); Liang J. Jiang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/182,490

(22) Filed: Jul. 30, 2008

(51) Int. Cl.
*G06F 9/45* (2006.01)

(52) U.S. Cl. ...................................... 717/176
(58) Field of Classification Search ................... 717/176
See application file for complete search history.

(56) References Cited

U.S. PATENT DOCUMENTS

| | | | |
|---|---|---|---|
| 6,643,778 B1 * | 11/2003 | Nakazawa | 726/11 |
| 7,174,390 B2 * | 2/2007 | Schulter et al. | 709/245 |
| 7,386,698 B2 | 6/2008 | Gimpl et al. | |
| 2002/0097725 A1 * | 7/2002 | Dighe et al. | 370/395.1 |
| 2003/0236852 A1 | 12/2003 | Fernandes et al. | |
| 2004/0202185 A1 * | 10/2004 | Ratcliff et al. | 370/395.53 |
| 2005/0044228 A1 | 2/2005 | Birkestrand et al. | |
| 2005/0188002 A1 * | 8/2005 | Yang | 709/200 |
| 2005/0289538 A1 | 12/2005 | Black-Ziegelbein et al. | |
| 2006/0075484 A1 * | 4/2006 | Yang | 726/15 |
| 2006/0095708 A1 | 5/2006 | Sater et al. | |
| 2007/0083672 A1 | 4/2007 | Shima et al. | |
| 2008/0005343 A1 | 1/2008 | Bauman et al. | |

OTHER PUBLICATIONS

Lynch, J., "Simplifying with NIM", *IBM Systems Magazine*, Feb. 2006, 3 pages.

* cited by examiner

*Primary Examiner*—John Chavis
(74) *Attorney, Agent, or Firm*—Jill A. Poimboeuf; Locke Lord Bissell & Liddell Ltd

(57) ABSTRACT

A system and method for network image propagation without a predefined network advantageously allows customers to automatically perform several system BOS installation or mksysb restoration over a virtual network with no predefined network and minimal installer configuration overhead. A method for network image propagation comprises: identifying a plurality of logical partitions residing in the logically partitioned terminal; configuring a temporary virtual network to connect said plurality of logical partitions to each other, wherein each one of the logical partitions is assigned at least one of a virtual Internet Protocol (IP) address and a virtual Media Access Control (MAC) address; installing an application image on at least one of the logical partitions via the temporary virtual network; deconfiguring the temporary virtual network; and assigning at least one of a physical IP address and a physical MAC address to said at least one logical partition on which the application has been installed.

1 Claim, 2 Drawing Sheets

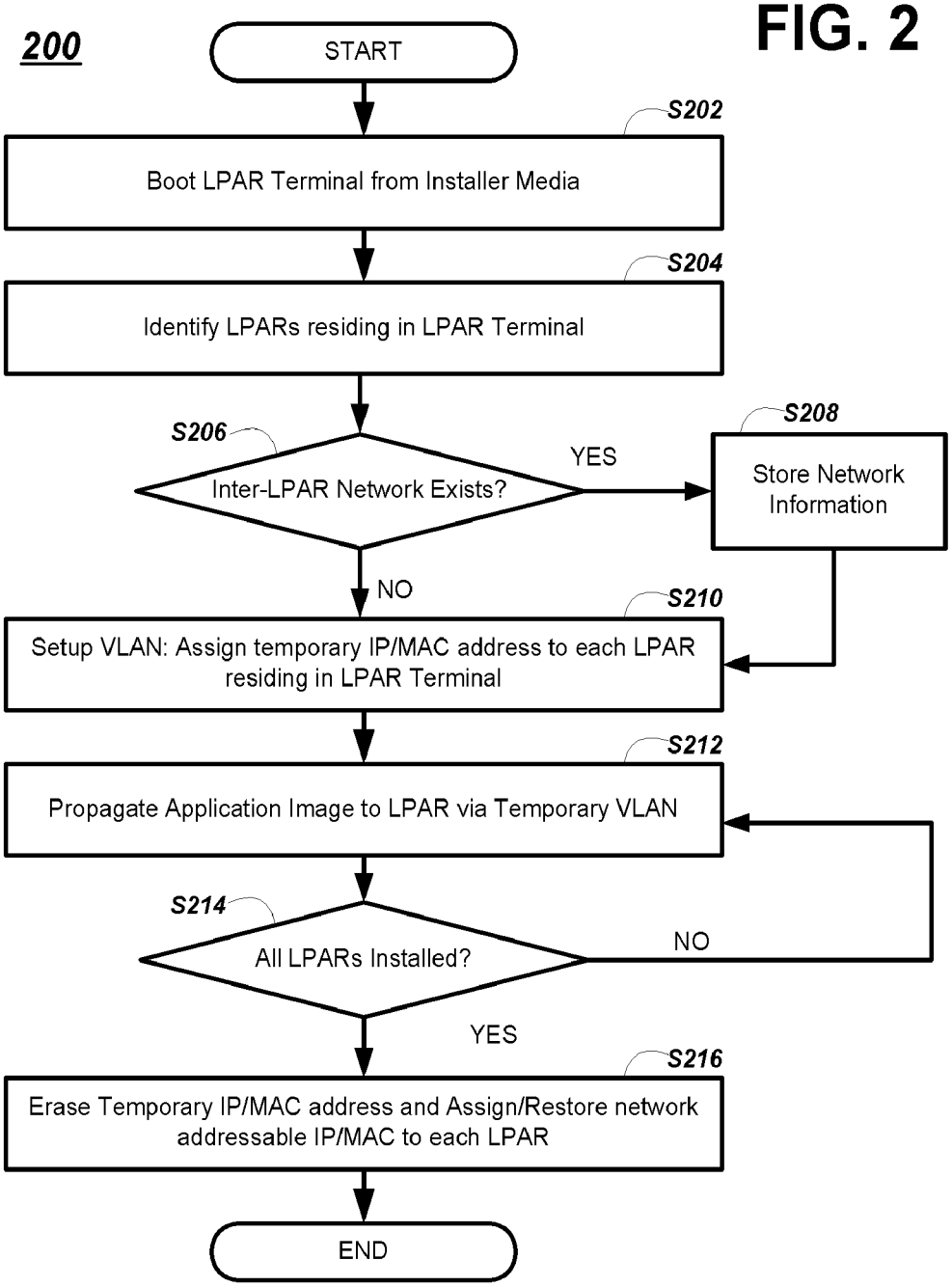

SYSTEM AND METHOD FOR NETWORK IMAGE PROPAGATION WITHOUT A PREDEFINED NETWORK

FIELD

The disclosure generally relates to computer systems administration, and more in particular to a system and method for network image propagation (e.g., propagating application images across a logically partitioned terminal) without a pre-configured network and without having to setup an network installation master.

BACKGROUND

Server administration is a major issue at many businesses with servers running plural logical partitions (LPARs). Each LPAR needs to be installed, backed up and maintained e.g., restored) from time to time. It normally takes several hours just to install one LPAR from scratch. In addition, cost effectiveness for backups and/or restores becomes a major concern when dealing with multiple LPAR clients. Current methods of installing, restoring and/or backing up applications to/from several LPARs are time consuming and costly.

For Example, in some conventional networks, a network installation manager (NIM) is utilized to provide network installations. NIM for AIX (Advanced Interactive eXecutive) sold by International Business Machines (IBM) Corporation is an example of an application used for network image propagation (e.g., installing applications on plural LPARs). NIM installation methods include: configuring a NIM master either internal or external to a frame of LPARs to be installed, configuring a inter-LPAR network on the frame, and performing image application propagation to each LPAR via the inter-LPAR network.

Setting up a NIM master involves various tasks including: (a) installing NIM file sets, (b) configuring basic resources, (c) creating machine and network definitions, and (d) allocating resources that are used to install the needed machines. In addition, the NIM master has certain minimum requirements. For example, the NIM master requires access to sufficient memory and processor power along with a fast network and access to some kind of installation media. The NIM master also requires sufficient disk space to provide storage space for the necessary resources for the client LPARs, as well as for the backups of their volume groups containing the basic operating system (rootvgs). In the foregoing NIM environment, the LPAR with the resources is also commonly referred to as the VIO (virtual I/O) Server and the other LPARs using it are referred to VIO clients or LPAR clients.

In order to establish and run a NIM master, there are many NIM resources that need to be defined prior to the installing/propagating of applications from to the NIM master to the LPAR clients. NIM resources are defined in a NIM database on the NIM master (VIO server). Some of the NIM resources include:

lpp_source: The Licensed Program Product source (lpp_source) directory contains the images that the OS (e.g., AIX) uses to load software. These are typically the backup file format (BFF) images that exist on the OS installation CDs or DVD. Each OS version should have its own lpp_source.

SPOT: The Shared Product Object Tree (SPOT) is a directory created from the lpp_source. The SPOT is used in a similar fashion to the boot images and installation scripts on the base installation CD (e.g., volume one for AIX). It may be necessary to create multiple SPOTs depending on the installation/maintenance levels and versions that must be supported.

Mksysb: A method for backing up the OS. The NIM master can use lpp_source to install an instance, or it can install the instance from a mksysb of either that instance or another one. An instance as used herein refers to an OS image.

Scripts: Scripts can be set to run during a BOS (basic operating system) install to ensure that the resulting instance of the OS is correctly tailored with any post-installation items. These can include security requirements, third-party software installation and other customizations related to additional paging or dump space.

bosinst_data: This is a file that contains the necessary information to allow the installation to take place without manual intervention. It is used to define defaults such as default disk drive, type of installation, or the like.

image_data: This file contains OS image information related to file systems, mirroring, or the like.

installp_bundles: These are files that list additional software to be loaded after the BOS is installed. This can be useful when setting up groups of servers. As an example, one bundle may be for DB2 servers, while another may be for Web servers. Once the OS is installed, a desired post-install bundle may be installed in the same fashion as the BOS.

Accordingly, it would be highly desirable to perform installation/propagation of applications (e.g. BOS installs, mksysb restores, system backups, or the like) across a logically partitioned computer system over a virtual network with no-predefined network and without the need to configure a NIM master. Thus, advantageously providing a system, method and/or computer program product for mass network installation with minimal installer configuration overhead.

SUMMARY

The following examples provide a system and a method for automatically installing (also referred herein as "propagating") application images across a logically partitioned computer system without a pre-configured network and with minimal installer configuration overhead. Exemplary embodiments of this disclosure would advantageously enable a user to automatically configure a temporary virtual inter-LPAR network, by temporary assigning virtual IP (internet protocol) and/or MAC (media access control) addresses solely for the purpose of installing (propagating) application images (e.g. BOS installs, mksysb restores, system backups, or the like) onto a plurality of LPARs. Upon successful installation, the temporary IP and/or MAC addresses would then be erased (deconfiguring the virtual network), and the newly installed LPARs would be assigned externally addressable (i.e. physical network) IP and/or MAC addresses through suitable network configuration methods.

In accordance with at least one disclosed example, a method for propagating applications in a logically partitioned terminal comprises: identifying a plurality of logical partitions residing in the logically partitioned terminal; configuring a temporary virtual network to connect said plurality of logical partitions to each other, wherein each one of the logical partitions is assigned at least one of a virtual Internet Protocol (IP) address and a virtual Media Access Control (MAC) address; installing an application image on at least one of the logical partitions via the temporary virtual network; deconfiguring the temporary virtual network; and assigning at least one of a physical IP address and a physical MAC address to said at least one logical partition on which the application has been installed.

BRIEF DESCRIPTION OF THE DRAWINGS

FIG. 2 is a schematic flowchart of an exemplary process performed for propagating application images from a computer readable media onto each of a plurality of LPARs.

DETAILED DESCRIPTION

Figure 1:
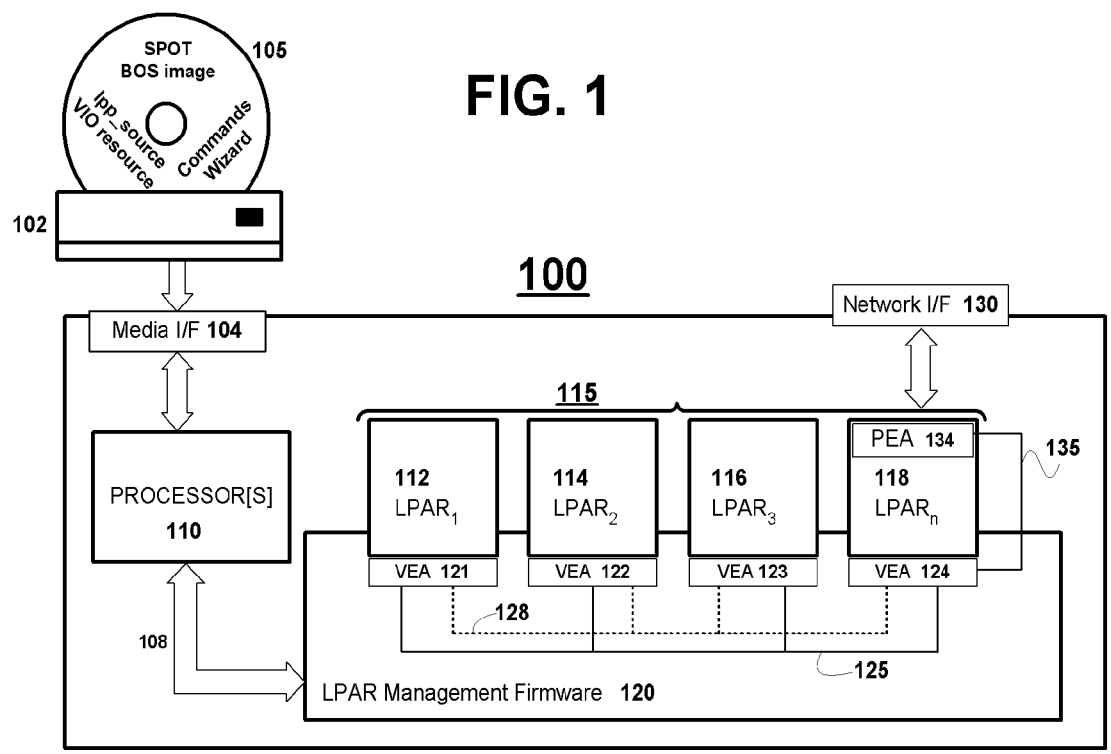
FIG. 1 is a schematic diagram of an exemplary logically partitioned environment where the present invention may be practiced.

In the following description of the various examples, reference is made to the accompanying drawings which are illustrations of various embodiments in which the system and method may be practiced. It is to be understood, however, that those skilled in the art may develop other structural and functional modifications without departing from the scope of the instant disclosure.

In the following description, specific details are set forth in order to provide a thorough understanding of the examples disclosed. In other instances, well-known methods, procedures, components, and circuits have not been described in detail as not to unnecessarily lengthen the present disclosure. Some embodiments of the present invention may be practiced on a computer system that includes, in general, one or a plurality of processors for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

As will be appreciated by those skilled in the art, the present examples may be embodied as a system, method or computer program product. Accordingly, some examples may take the form of an entirely hardware embodiment, and entirely software embodiment (including firmware, resident software, micro-code, etc.) or an embodiment combining software and hardware aspects that may all generally be referred herein as a "circuit", "module" or "system". Further, some embodiments may take the form of a computer program product embodied in any tangible medium of expression having computer-usable program code stored therein. For example, some embodiments described below with reference to flowchart illustrations and/or block diagrams of methods, apparatus (systems) and computer program products can be implemented by computer program instructions. The computer program instructions may be stored in computer-readable media that can direct a computer or other programmable data processing apparatus to function in a particular manner, such that the instructions stored in the computer-readable media constitute an article of manufacture including instructions and processes which implement the function/act/step specified in the flowchart and/or block diagram.

Referring now to the drawings, wherein like reference numerals refer to like parts, FIG. 1 is a block diagram illustrating an exemplary logically partioned computer system 100, which may appropriately be referred also as an "LPAR terminal." In accordance with at least one illustrative embodiment disclosed herein, computer system 100 may be implemented using various commercially available computer systems. For example, any one of an IBM AS/400 computer system or an enhanced IBM eServer iSeries computer system represents one suitable type of computer system that supports logical portioning and may be used to practice the disclosed examples. FIG. 1 is intended as an illustration only, and not as an architectural limitation for the present disclosure. Accordingly, those skilled in the art will appreciate that the mechanisms and apparatus disclosed herein apply equally to any computer system that supports logical partitions.

As illustrated in FIG. 1, this example of a computer system 100 comprises one or a plurality of processor(s) 110 operatively connected to media drive 102 via media I/F 104 and to memory bank 115 via a system bus 108. Memory bank 115 contains logical partitions ($PLAR_{1-n}$) herein designated by reference numerals 112, 114, 116 and 118. Although the partitions 112-118 are shown in FIG. 1 to reside outside processor 110, those skilled in the art will recognize that a partition is a logical construct that includes the division of a computer system's processor(s), memory, and hardware resources into multiple units so that each unit can be operated independently from each other with its own operating system and applications. The number of logical partitions that can be created depends on the computer system's processor(s) model and resources available. Other elements (e.g. hardware resources, memory buses, I/O circuits, etc) of logically portioned computer system 100 will be readily apparent to those skilled in the art and are therefore omitted in this disclosure.

Each one of $LPAR_1$ through $LPAR_n$, contains a virtual Ethernet adapter (VEA) designated by reference numerals 121, 122, 123 and 124, respectively. LPARs 112-118 can communicate among themselves using VEAs 122-124, via virtual network 125, using LPAR management firmware 120, such as IBM's Hypervisor. Persons of ordinary skill in the art will appreciate that although IBM's Hypervisor product is used here as an example of LPAR management firmware 120, other partition management firmware products may be used. In addition, virtual Ethernet technology, which enables Internet Protocol (IP) based communication between logical partitions on the same computer system, is well known and detailed description thereof is omitted. Those interested in further details regarding virtual Ethernet technology may refer to, for example, the IEEE 802.1Q standard, which describes virtual LAN (VLAN) technology.

LPARs 112-118 needing to access to an outside network may use a network interface (I/F) 130, such as, e.g., an Ethernet switch. In order to communicate via network I/F 130, LPARs 112-118 may use physical Ethernet adapters (PEA) which may be assigned to each logical partition, or may use a shared physical Ethernet adapter (SEA) located in any LPAR and connected to network I/F 130. In the example illustrated in FIG. 1, LPARs 112-118 may connect to an outside network using a shared PEA 134 via virtual networks 125 and 135. Those skilled in the art may readily recognize the various virtual and/or physical topographies in which LPARs 112-118 may be connected to an outside network via network I/F 130. Accordingly, the illustrative diagram of FIG. 1 is intended for exemplary purposes only.

Returning to FIG. 1, processor 110 is shown to be operatively connected to a media drive 102, which has access to computer-readable media 105 (hereafter simply referred to as "media 105"). Examples of computer readable media may include: nonvolatile, hard-coded type media such as Read Only Memories (ROMS) or Erasable, Electrically Programmable Read Only Memories (EEPROMs), recordable type media such as floppy disks, hard disk drives, CD-ROMs and DVD ROMs, and transmission type media such as digital and analog communication links, and wired or wireless communications links using transmission forms, such as, for example, radio frequency and light wave transmissions. The computer readable media may take the form of coded formats that are decoded for actual use in a particular data processing system.

In accordance with an exemplary embodiment, the depicted example of media 105 in FIG. 1 represents a version of media that has a ready to run version of NIM. In other words, media 105 may be encoded with the required NIM resources comprising, for example, a base SPOT, lpp_source, at least basic VIO capabilities and any additional software needed for the installation/propagation of application images. Accordingly, in this particular embodiment, media 105 represents a network installer image that does not have to be installed as a NIM master (VIO server) into a dedicated LPAR to function. That is to say, a user may install/propagate application images across LPARs 112-118 directly from media 105 without having to configure a NIM master and/or VIO server. In addition, as it is more fully explained below, logically partitioned computer system 100 needs not have a pre-defined network in order to perform the installation/propagation of application images.

With reference now to FIG. 2, a process 200 for propagating application images from computer readable media 105 onto each of a plurality of LPARs is illustrated. The process is described from the perspective of a user (e.g., systems manager, network administrator, or the like) initiating the installation/propagation of application images across LPARs 112-118. For simplicity of describing, it is assumed that media 105 comprises all the necessary installation resources including, for example, a BOS boot image stored thereon, which may be utilized by the user to perform the various steps required for the installation. In addition, media 105 may be provided with a self-starting application "wizard" (e.g. an auto executing file) that would automatically launch and perform process 200 with minimal or not user intervention at all.

Process 200 starts when the user loads media 105 into media drive 102 of FIG. 1. At step S202, logically portioned computer system 100 boots from media 105. At step S204, instructions stored in media 105 cause processor 110 with the aide of firmware 120 to identify all available LPARs residing in LPAR terminal 100, and determines whether an inter-LPAR network exists (S206). If it is determined that an inter-LPAR network exists (YES at S206), processor 110 identifies each LPAR in a conventional manner and stores any available identification (e.g. MAC address or VID) of each LPAR in memory (S208). Alternatively, when no inter-LPAR network exists, the process advances (NO at S206) forward to S210. At step S210, additional software resources in media 105 cause processor 110 to setup a temporary virtual network (e.g., temporary VLAN).

A temporary VLAN (represented in FIG. 1 by chain-link lines 128) may be configured utilizing currently known technology, such as the above-mentioned IEEE 802.1Q standard in combination with suitable networking protocols, such as TCP/IP protocols. For example, if no inter-LPAR network has been predefined between LPARs 112-118 of FIG. 1, VIO resources encoded in media 105 may automatically assign a virtual Ethernet adapter (VEA) to each existing LPAR. Then, by using virtual addressing and keeping the IP addresses to an internal subnet, such as, e.g., the 192.168.0.x address commonly used by DHCP (Dynamic Host Configuration Protocol) routers, it is possible to temporarily assign a unique IP address known only internally to the CEC (central electronic complex) of computer system 100. Alternatively, in the case that a inter-LPAR network may have been pre-established between LPARs 112-118, software resources provided in media 105 may instruct processor 110 to setup an new and/or additional VLAN by assigning temporary MAC (Media Access Control) addresses to each one the VEAs 121-124. Whether using virtual MAC addresses, virtual IP addresses, or a combination thereof, a temporary inter-LPAR network is created by connecting LPARs 112-118 to one another for purposes of installation only. Thus avoiding conflicts with pre-established physical or virtual networks.

After a temporary virtual network has been established, the process advances to step S208. At step S212, software resources encoded in media 105 cause processor 110 to propagate (i.e. install) application images (e.g., BOS installs or mksysb, and any additional software necessary) to each one of LPARs 112-118 via the newly created VLAN. In the exemplary embodiment of FIG. 1, VIO resources provided in media 105 in combination with firmware 120 may provide basic VLAN tagging for the dynamic routing of data packets to their respective destinations via the temporary virtual network 128 created at step S210. At step S214, process 200 ensures that all the desired LPAR units have been properly installed with the designated applications and advances forward (YES at S214) to the next step. Alternatively, application image propagation is automatically repeated (NO at S214) until all of the LPARs 112-118 residing in computer system 100 have been installed.

At step S216, after all installations have been performed, software resources encoded in media 105 instruct processor 110 to erase (e.g., deconfigure) temporary virtual networking resources. For example, the temporary virtual IP/MAC addresses assigned at step S210 are now erased, and a new set of permanent physically addressable IP/MAC addresses are assigned to all or selected physical Ethernet adapters residing in any of LPARs 112-118. In the embodiment of FIG. 1, for example, a PEA 134 would be assigned an IP and/or MAC address that would be addressable from an outside network via network I/F 130. In addition, VEAs 121-124 may be assigned permanent IP/MAC addresses in order to connect to PEA 134 via a virtual network connection 135. In the case that a virtual and/or physical network had been pre-established between LPARs 112-118 prior to the propagation of application images, the network information stored at step S208 is restored to its original state. As a result, the process ends the propagation of application images with minimal user interaction and without the need of a pre-existing network.

It is contemplated that the exemplary method set forth above can be implemented in an automated manner, without the need for repeated user intervention and directly from removable storage media without having to define and install a NIM master and/or VIO server. Those skilled in the art will appreciate that many variations are possible within the scope of the examples described herein. Thus, while the features of the invention have been described with reference to particular examples, it will be understood that these and other changes may be made within the scope of the following claims.

What is claimed is:

1. A method for propagating applications in a logically partitioned memory bank, the memory bank residing in a single computer system, the method comprising:
   identifying a plurality of logical partitions residing in the logically partitioned terminal;
   configuring a temporary virtual network to connect said plurality of logical partitions to each other, wherein each one of the logical partitions is assigned at least one of a virtual Internet Protocol (IP) address and a virtual media access control (MAC) address;
   installing an application on at least one of the logical partitions via the temporary virtual network;
   deconfiguring the temporary virtual network; and
   assigning at least one of a physical IP address and a physical MAC address to said at least one logical partition on which the application has been installed.

* * * * *